United States Patent
Atassi et al.

(10) Patent No.: US 9,429,103 B2
(45) Date of Patent: Aug. 30, 2016

(54) VARIABLE AREA FAN NOZZLE WITH WALL THICKNESS DISTRIBUTION

(71) Applicants: Oliver V. Atassi, Longmeadow, MA (US); Oleg Petrenko, Danbury, CT (US)

(72) Inventors: Oliver V. Atassi, Longmeadow, MA (US); Oleg Petrenko, Danbury, CT (US)

(73) Assignee: United Technologies Corporation, Hartford, CT (US)

( * ) Notice: Subject to any disclaimer, the term of this patent is extended or adjusted under 35 U.S.C. 154(b) by 843 days.

(21) Appl. No.: 13/742,647

(22) Filed: Jan. 16, 2013

(65) Prior Publication Data

US 2014/0259661 A1 Sep. 18, 2014

Related U.S. Application Data

(62) Division of application No. 13/363,219, filed on Jan. 31, 2012, now Pat. No. 8,375,699.

(51) Int. Cl.
| | |
|---|---|
| *F02K 1/06* | (2006.01) |
| *F02K 1/48* | (2006.01) |
| *F02K 3/04* | (2006.01) |
| *F02K 1/72* | (2006.01) |

(52) U.S. Cl.
CPC . *F02K 1/06* (2013.01); *F02K 1/48* (2013.01); *F02K 3/04* (2013.01); *F02K 1/72* (2013.01); *Y02T 50/672* (2013.01); *Y10T 29/49229* (2015.01)

(58) Field of Classification Search
CPC .............. F02K 1/48; F02K 3/04; F02K 1/72; F02K 1/06; Y02T 50/672; Y10T 29/49229; F05D 2260/81
See application file for complete search history.

(56) References Cited

U.S. PATENT DOCUMENTS

| | | | |
|---|---|---|---|
| 3,287,906 A | | 11/1966 | McCormick |
| 3,527,317 A | * | 9/1970 | Motsinger ..................... 181/206 |
| 3,754,484 A | | 8/1973 | Roberts |
| 3,806,068 A | | 4/1974 | Blythe et al. |
| 3,892,358 A | | 7/1975 | Gisslen |
| 4,130,872 A | | 12/1978 | Harloff |
| 4,826,106 A | | 5/1989 | Anderson |
| 5,433,674 A | | 7/1995 | Sheridan et al. |
| 5,447,411 A | | 9/1995 | Curley et al. |
| 5,524,847 A | | 6/1996 | Brodell et al. |
| 5,778,659 A | | 7/1998 | Duesler et al. |

(Continued)

FOREIGN PATENT DOCUMENTS

| | | |
|---|---|---|
| GB | 1516041 | 6/1978 |
| GB | 2041090 | 9/1980 |
| WO | 2007038674 | 4/2007 |

OTHER PUBLICATIONS

International Search Report and Written Opinion for International Application No. PCT/US2013/020460 completed on Oct. 16, 2013.

(Continued)

*Primary Examiner* — Carlos A Rivera
(74) *Attorney, Agent, or Firm* — Carlson, Gaskey & Olds, P.C.

(57) ABSTRACT

A method of controlling flutter of a fan nozzle includes, for a given design of a fan nozzle, determining a vibration mode that causes a flutter characteristic of the fan nozzle and, in response to the determined vibration mode, establishing a wall thickness distribution of at least one wall of the fan nozzle to include local thick portions and local thin portions that alter the flutter characteristic.

5 Claims, 3 Drawing Sheets

(56) References Cited

U.S. PATENT DOCUMENTS

| | | | |
|---|---|---|---|
| 5,857,836 A | 1/1999 | Stickler et al. | |
| 5,915,917 A | 6/1999 | Eveker et al. | |
| 5,975,841 A | 11/1999 | Lindemuth et al. | |
| 6,223,616 B1 | 5/2001 | Sheridan | |
| 6,318,070 B1 | 11/2001 | Rey et al. | |
| 6,718,752 B2 | 4/2004 | Nesbitt et al. | |
| 6,735,936 B2 | 5/2004 | Rey et al. | |
| 6,814,541 B2 | 11/2004 | Evans et al. | |
| 6,920,958 B2 | 7/2005 | Harrison | |
| 7,021,042 B2 | 4/2006 | Law | |
| 7,082,371 B2* | 7/2006 | Griffin | G01H 1/006 702/10 |
| 7,206,709 B2* | 4/2007 | Griffin | G01H 1/006 702/85 |
| 7,383,136 B1* | 6/2008 | Griffin | G01H 1/006 702/56 |
| 7,591,754 B2 | 9/2009 | Duong et al. | |
| 7,617,166 B2* | 11/2009 | Haudrich et al. | 706/22 |
| 7,694,505 B2 | 4/2010 | Schilling | |
| 7,721,551 B2 | 5/2010 | Hanson | |
| 7,753,652 B2* | 7/2010 | Truckenmueller et al. | 416/189 |
| 7,824,305 B2 | 11/2010 | Duong et al. | |
| 7,926,260 B2 | 4/2011 | Sheridan et al. | |
| 8,156,727 B2 | 4/2012 | Dijoud et al. | |
| 8,205,432 B2 | 6/2012 | Sheridan | |
| 8,375,699 B1* | 2/2013 | Atassi et al. | 60/226.3 |
| 2002/0064458 A1* | 5/2002 | Montgomery et al. | 415/208.3 |
| 2004/0243310 A1* | 12/2004 | Griffin | G01H 1/006 702/10 |
| 2008/0256957 A1 | 10/2008 | Webster | |
| 2009/0053058 A1 | 2/2009 | Kohlenberg et al. | |
| 2009/0067993 A1 | 3/2009 | Roberge et al. | |
| 2009/0099796 A1 | 4/2009 | Yang et al. | |
| 2010/0014932 A1 | 1/2010 | Albinsson et al. | |
| 2010/0050595 A1 | 3/2010 | Migliaro, Jr. et al. | |
| 2010/0064659 A1 | 3/2010 | Wang | |
| 2010/0107600 A1 | 5/2010 | Hillel et al. | |
| 2010/0126139 A1 | 5/2010 | Howe | |
| 2010/0148396 A1 | 6/2010 | Xie et al. | |
| 2010/0170746 A1 | 7/2010 | Restuccia et al. | |
| 2010/0331139 A1 | 12/2010 | McCune | |
| 2011/0052405 A1* | 3/2011 | Parkin | F01D 5/147 416/230 |
| 2011/0120080 A1* | 5/2011 | Schwark, Jr. | F02K 1/09 60/226.3 |
| 2012/0011825 A1* | 1/2012 | Hall et al. | 60/204 |
| 2013/0036611 A1 | 2/2013 | Hanna et al. | |

OTHER PUBLICATIONS

International Search Report and Written Opinion for International Application No. PCT/US2014/023232 mailed on Jul. 10, 2014.

Gunston: "Jane's Aero-Engines," Pratt & Whitney/USA, Mar. 2000, JAEng—Issue 7, Copyright 2000 by Jane's Information Group Limited, pp. 510-512.

International Preliminary Report on Patentability for PCT Application No. PCT/US2013/020460, mailed May 14, 2015.

NASA Conference Publication. Quiet, powered-lift propulsion. Cleveland, Ohio. Nov. 14-15, 1978.

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8), p. 32.

Hendricks, E.S. and Tong, M.T. (2012). Performance and weight estimates for an advanced open rotor engine. MASA/TM-2012-217710.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883.

Zalud, T. (1998). Gears put a new spin on turbofan performance. Machine Design, 70(20), p. 104.

Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida.

Agarwal, B.D and Broutman, L.J. (1990). Analysis and performance of fiber composites, 2nd Edition. John Kiley & Sons, Inc. New York: New York.

Carney, K., Pereira, M. Revilock, and Matheny, P. Jet engine fan blade containment using two alternate geometries. 4th European LS-DYNA Users Conference.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis.

Hess, C. (1998). Pratt & Whitney develops geared turbofan. Flug Revue 43(7). Oct. 1998.

Grady, J.E., Weir, D.S., Lamoureux, M.G., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

Brennan, P.J. and Kroliczek, E.J. (1979). Heat pipe design handbook. Prepared for National Aeronautics and Space Administration by B & K Engineering, Inc. Jun. 1979.

Horikoshi, S. and Serpone, N. (2013). Introduction to nanoparticles. Microwaves in nanoparticle synthesis. Wiley-VCH Verlag GmbH & Co. KGaA.

Kerrebrock, J.L. (1977). Aircraft engines and gas turbines. Cambridge, MA: The MIT Press.

Xie, M. (2008). Intelligent engine systems: Smart case system. NASA/CR-2008-215233.

Knip, Jr., G. (1987). Analysis of an advanced technology subsonic turbofan incorporating revolutionary materials. NASA Technical Memorandum. May 1987.

Willis, W.S. (1979). Quiet clean short-haul experimental engine (QCSEE) final report. NASA/CR-159473.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press.

Ramsden, J.M. (Ed). (1978). The new European airliner. Flight International, 113(3590). Jan. 7, 1978.

Langston, L. and Faghri, A. Heat pipe turbine vane cooling. Prepared for Advanced Turbine Systems Annual Program Review. Morgantown, West Virginia. Oct. 17-19, 1995.

Oates, G.C. (Ed). (1989). Aircraft propulsion systems and technology and design. Washington, D.C.: American Institute of Aeronautics, Inc.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc.

(56) References Cited

OTHER PUBLICATIONS

Pyrograf-III Carbon Nanofiber. Product guide. Retrieved from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc.

Ratna, D. (2009). Handbook of thermoset resins. Shawbury, UK: iSmithers.

Wendus, B.E., Stark, D.F., Holler, R.P., and Funkhouser, M.E. (2003). Follow-on technology requirement study for advanced subsonic transport. NASA/CR-2003-212467.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983.

Dickey, T.A. and Dobak, E.R. (1972). The evolution and development status of ALF 502 turbofan engine. National Aerospace Engineering and Manufacturing Meeting. San Diego, California. Oct. 2-5, 1972.

Gunston, B. (Ed.) (2000). Jane's aero-engines, Issue seven. Coulsdon, Surrey, UK: Jane's Information Group Limited.

Ivchenko-Progress D-436. Jane's Aero-engines, Aero-engines—Turbofan. Feb. 8, 2012.

Ivchenko-Progress AI-727M. Jane's Aero-engines, Aero-engines—Turbofan. Nov. 27, 2011.

Ivchenko-Progress D-727. Jane's Aero-engines, Aero-engines—Turbofan. Feb. 7, 2007.

Turbomeca Aubisque. Jane's Aero-engines, Aero-engines—Turbofan. Nov. 2, 2009.

Aviadvigatel D-110. Jane's Aero-engines, Aero-engines—Turbofan. Jun. 1, 2010.

Rolls-Royce M45H. Jane's Aero-engines, Aero-engines—Turbofan. Feb. 24, 2010.

Honeywell LF502. Jane's Aero-engines, Aero-engines—Turbofan. Feb. 9, 2012.

Honeywell LF507. Jane's Aero-engines, Aero-engines—Turbofan. Feb. 9, 2012.

Honeywell TFE731. Jane's Aero-engines, Aero-engines—Turbofan. Jul. 18, 2012.

International Preliminary Report on Patentability for PCT Application No. PCT/US2014/023232 mailed Sep. 24, 2015.

\* cited by examiner

VARIABLE AREA FAN NOZZLE WITH WALL THICKNESS DISTRIBUTION

CROSS REFERENCE TO RELATED APPLICATIONS

The present disclosure is a Division of U.S. patent application Ser. No. 13/363,219, filed Jan. 31, 2012.

BACKGROUND

The present disclosure relates to gas turbine engines and, more particularly, to a variable area fan nozzle of a gas turbine engine.

A typical gas turbine engine includes a fan section that is driven by a core engine. The fan section drives air through an annular bypass passage. The air is discharged through a fan nozzle. In some designs, the fan nozzle is moveable to selectively change a nozzle exit area of the fan nozzle and influence operation of the fan section, for example.

SUMMARY

A method of controlling flutter of a fan nozzle according to an aspect of the present disclosure includes, for a given design of a fan nozzle, determining a vibration mode that causes a flutter characteristic of the fan nozzle and, in response to the determined vibration mode, establishing a wall thickness distribution of at least one wall of the fan nozzle which includes local thick portions and local thin portions that alter the flutter characteristic.

In a further non-limiting embodiment of any of the foregoing examples, the vibration mode includes a vibration frequency and a strain mode that is selected from a group consisting of bending strain and torsion strain.

In a further non-limiting embodiment of any of the foregoing examples, the flutter characteristic includes at least one of an amount of flutter and a location of flutter.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
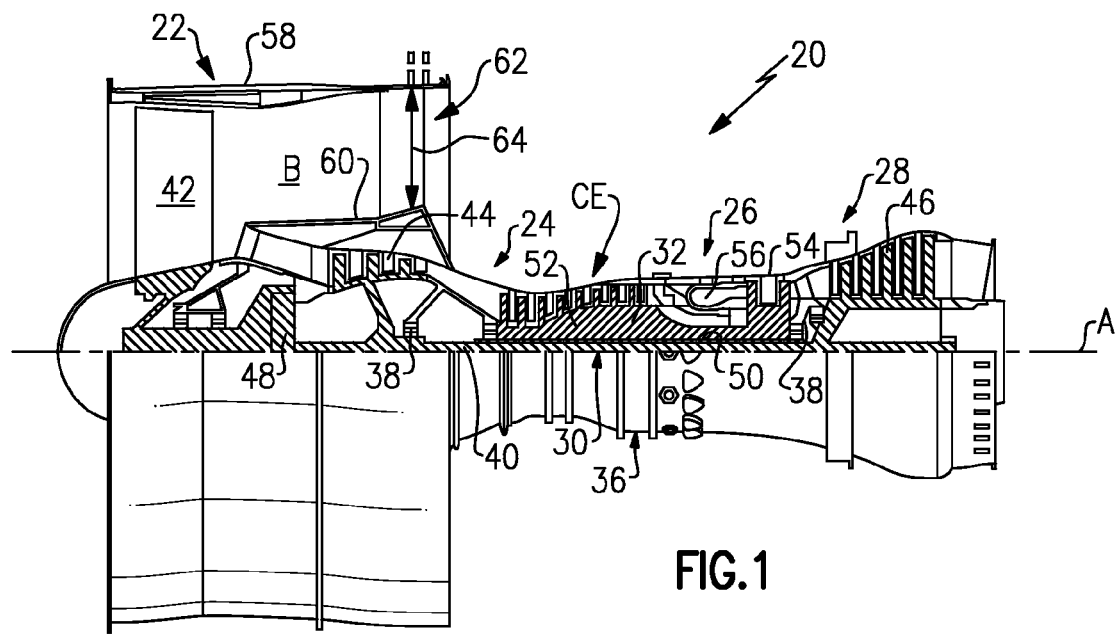
FIG. 1 schematically illustrates an example gas turbine engine.
Figure 2:
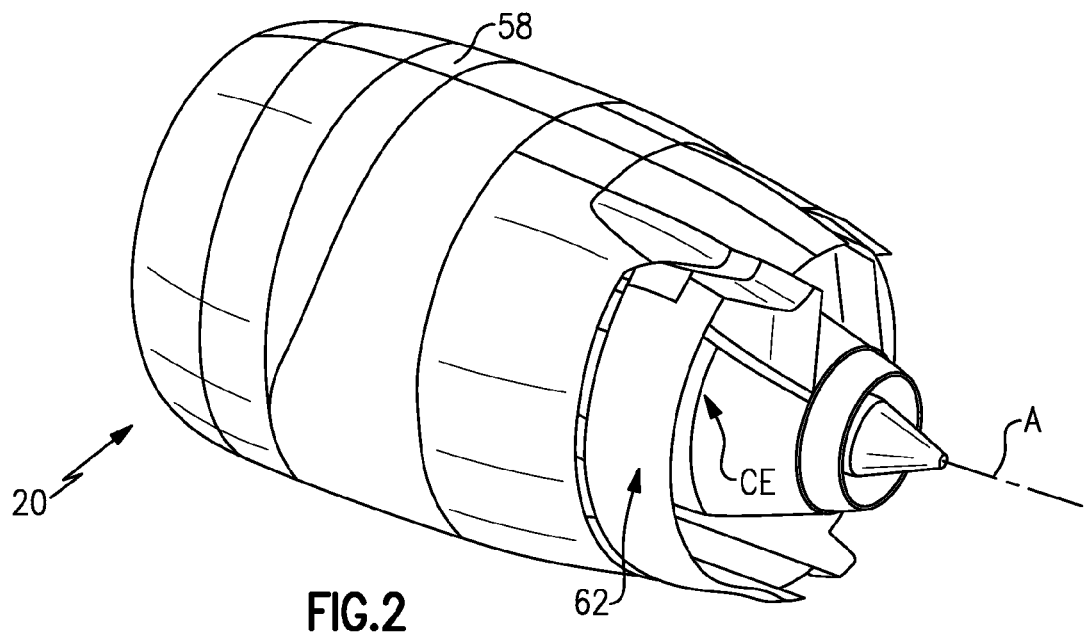
FIG. 2 illustrates a perspective view of the gas turbine engine of FIG. 1.

FIG. 1 schematically illustrates an example gas turbine engine 20, and FIG. 2 illustrates a perspective view of the gas turbine engine 20. The gas turbine engine 20 is disclosed herein as a two-spool turbofan that generally incorporates a fan section 22 and a core engine CE that includes a compressor section 24, a combustor section 26 and a turbine section 28 generally disposed along an engine central longitudinal axis A. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 includes a low pressure spool 30 and a high pressure spool 32 mounted for rotation about the engine central longitudinal axis A relative to an engine static structure 36 via several bearing systems 38. It should be understood that various bearing systems 38 at various locations may alternatively or additionally be provided.

The low speed spool 30 generally includes an inner shaft 40 that typically couples a fan 42, a low pressure compressor 44 and a low pressure turbine 46. In the illustrated embodiment, the inner shaft 40 is connected to the fan 42 through a geared architecture 48 to drive the fan 42 at a speed different than the low speed spool 30, in this case slower than the spool 30. The high speed spool 32 includes an outer shaft 50 that couples a high pressure compressor 52 and high pressure turbine 54. An annular combustor 56 is arranged between the high pressure compressor 52 and the high pressure turbine 54. The inner shaft 40 and the outer shaft 50 are concentric and rotate via bearing systems 38 about the engine central longitudinal axis A which is typically collinear with their longitudinal axes.

A fan nacelle 58 extends around the fan 42. A core nacelle 60 extends around the core engine CE. The fan nacelle 58 and the core nacelle 60 define a bypass passage or duct B therebetween. A variable area fan nozzle (VAFN) 62 extends at least partially around the central longitudinal axis A and defines an exit area 64 of the bypass passage B. The VAFN 62 is selectively movable in a known manner to vary the exit area 64.

The compressor section 24 moves air along a core flowpath for compression and presentation into the combustor section 26, then expansion through the turbine section 28. The core airflow is compressed by the low pressure compressor 44 and the high pressure compressor 52, mixed and burned with fuel in the combustor 56, then expanded over the high pressure turbine 54 and low pressure turbine 46. The turbines 46, 54 rotationally drive the respective low pressure spool 30 and high pressure spool 32 in response to the expansion.

In a further example, the engine 20 is a high-bypass geared aircraft engine that has a bypass ratio that is greater than about six (6), with an example embodiment being greater than ten (10), the gear assembly 48 is an epicyclic gear train, such as a planetary or star gear system or other gear system, with a gear reduction ratio of greater than about 2.3:1 or greater than about 2.5:1 and the low pressure turbine 46 has a pressure ratio that is greater than about 5. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary.

Most of the thrust is provided through the bypass passage B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

Figure 3:
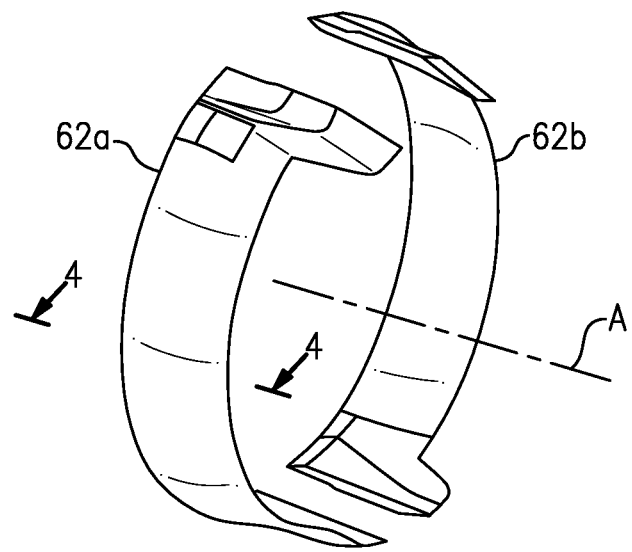
FIG. 3 illustrates a perspective, isolated view of a variable area fan nozzle.

FIG. 3 illustrates a perspective, isolated view of selected portions of the VAFN 62. As shown, the VAFN 62 is a bifurcated design that includes a first VAFN section 62a and a second VAFN section 62b. In general, each of the VAFN sections 62a and 62b are semi-circular and extend around the central longitudinal axis A of the engine 20.

Figure 4:
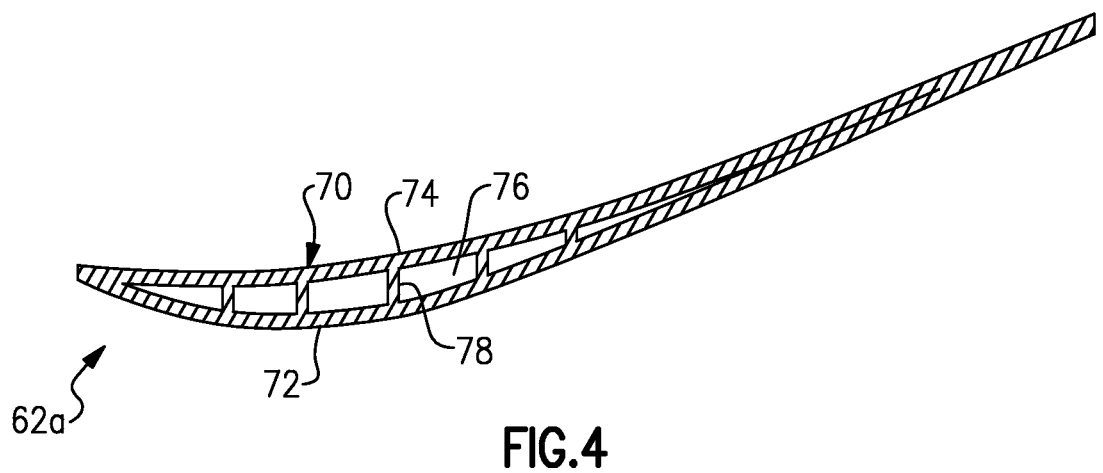
FIG. 4 illustrates a cross-section through a variable area fan nozzle.

FIG. 4 schematically illustrates a cross-section through the first VAFN section 62a. It is to be understood that the geometry of the first VAFN section 62a is exaggerated for the purpose of this description and is not a limitation to the disclosed geometry. It is to be further understood that the second VAFN section 62b is of similar construction and geometry as the first VAFN section 62a. In this example, the VAFN section 62a includes a body 70 that extends at least partially around the central longitudinal axis A of the engine 20. The body 70 includes a radially outer wall 72 and a radially inner wall 74 that together form the overall shape of the body 70 and thus the VAFN section 62a. In this example, the body 70 generally has an airfoil cross-sectional shape. That is, the walls 72 and 74 of the body 70 form a wing-like shape to provide a reaction force via Bernoulli's principle with regard to air flow over the walls 72 and 74.

In this example, the VAFN section 62a is a hollow structure. Thus, the radially inner wall 74 is radially-inwardly spaced from the radially outer wall 72 such that there is an open space 76 between the walls 72 and 74. Optionally, the VAFN section 62a includes supports 78 extending between walls 72 and 74 from wall 72 to wall 74 to stiffen and strengthen the structure.

In operation, the first VAFN section 62a and the second VAFN section 62b are selectively moveable to vary the exit area 64 of the engine 20. For example, the VAFN sections 62a and 62b are movable between at least a stowed position and a deployed position such that in the deployed position a greater exit area 64 is provided.

Airflow through the bypass passage B flows over the radially inner wall 74 and, at least when the VAFN 62 is in the deployed position, also over the radially outer wall 72. The airflow over the VAFN 62 causes vibrations in the VAFN sections 62a and 62b. Depending upon, for example, the weight of the VAFN 62, certain vibration modes (i.e., frequencies), can cause the VAFN sections 62a and 62b to flutter. Flutter is an aeroelastic event where the aerodynamic forces due to vibration, in combination with the natural mode of vibration, produce a significant and periodic motion in the VAFN sections 62a and 62b. The flutter can, in turn, elevate stresses at certain locations, cause the VAFN 62 to contact the fan nacelle 58 or damage the VAFN 62. As will be described in more detail below, the disclosed VAFN 62 includes a strategic wall thickness distribution to reduce flutter and thereby enhance the durability of the VAFN 62 and engine 20.

Figure 5:
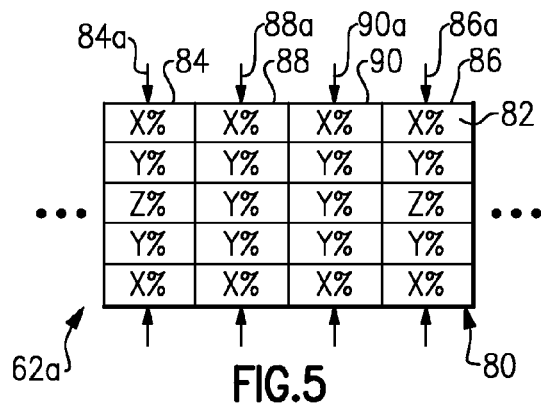
FIG. 5 illustrates a representation of a wall thickness distribution that includes local thick portions and local thin portions.

FIG. 5 shows a representation of a wall thickness distribution 80 of the radially outer wall 72, the radially inner wall 74 or both of the first VAFN section 62a. That is, the walls 72 and 74 may have equivalent or similar wall thickness distribution 80 or, alternatively, have dissimilar wall thickness distributions 80. In that regard, in one embodiment, the radially outer wall 72 has a first wall thickness distribution and the radially inner wall 74 has a second wall thickness distribution that is different than the first wall thickness distribution.

The wall thickness distribution 80 is represented by a plurality of thickness zones 82. As an example, the walls 72 and 74 are made of a fiber-reinforced polymer matrix material and the thickness zones 82 represent one or more layers or plies in a multi-layered structure of the material. In that regard, each of the layers or plies that represents the thickness zone 82 is selected to have predetermined thickness such that when the layers of all of the thickness zones 82 are stacked and formed into the wall 72 or 74, the difference in the individual thicknesses of the layers produce local thick portions 84/86, and local thin portions 88/90.

In this example, each of the thickness zones 82 is represented as a percent thickness, X %, Y % or Z %, of a preset maximum thickness of the thickness zones 82. As an example, X %<Y %<Z %. In a further example, X % is less than 40%, Y % is from 40-60% and Z % is greater than 60%. In a further example, the present maximum thickness of one thickness zone 82 is 0.5 inches (1.27 centimeters) or less. In embodiments, the thickness of a layer or ply, and thus the percent thickness, is established by changing the fiber density, fiber volume percent or area weight of polymer of the layer or ply. Alternatively, each layer or ply is made up of sub-layers or sub-plies, and the number of sub-layers or sub-plies is changed to alter percent thickness.

For a given location or portion of the wall 72 or 74, the overall thickness, as represented in FIG. 5, is determined by the sum of the thicknesses of the thickness zones 82 in the particular location. Thus, the local thick portions 84/86 have thicknesses represented at 84a/86a, and the local thin portions 88/90 have thicknesses represented at 88a/90a. That is, the thickness 84a is the sum of the thickness zones 82 (in the vertical column) of X %, Y %, Z %, Y % and X %. Similarly, the thicknesses 86a, 88a and 90a are determined by the sum of the thickness zones 82 in the respective vertical columns at those locations.

In a further example, the local thin portions 88/90 have a minimum thickness, thickness 88a, and the local thick portions 84/86 have a maximum thickness, thickness 84a. The minimum thickness 88a is 90% or less of the maximum thickness 84a. In a further example, the minimum thickness 88a is 80% or less of the maximum thickness 84a. In another embodiment, the minimum thickness 88a is 70% or less of the maximum thickness 84a, and in a further example the minimum thickness 88a is 60% or less of the maximum thickness 86a. Additionally, in a further example, the arrangement of the local thick portions 84/86 and the local thin portions 88/90 with respect to location from the leading end to the trailing end of the VAFN section 62a is a repeating pattern or symmetric pattern.

The individual thicknesses of the zones 82, and thus the local thick portions 84/86 and local thin portions 88/90, are selected to control a flutter characteristic of the VAFN 62. In one embodiment, for a given design of a fan nozzle, which may be a fan nozzle or a variable area fan nozzle, a vibration mode is determined that causes a flutter characteristic of the fan nozzle. As an example, the flutter characteristic includes an amount of flutter, location of flutter or both. The vibration mode, as used herein, includes at least one of a vibration frequency and a strain mode, such as bending strain or torsion strain. Thus, for a given vibration frequency and a given strain mode, the given design of the fan nozzle can be analyzed, such as by using finite element analysis, to determine one or more flutter characteristics of the fan nozzle.

In response to the determined vibration mode, the wall thickness distribution 80 is established such that the radially outer wall 72, the radially inner wall 74 or both include local thick portions 84/86 and local thin portions 88/90 that alter the flutter characteristic. Without being bound to any particular theory, at a given location, the local thickness of the respective wall 72 and/or 74 influences the flutter characteristic at that location. In general, at each local location, the local wall thickness is reduced or minimized to alter the flutter characteristic and thus also reduce or minimize the overall weight.

Figure 6:
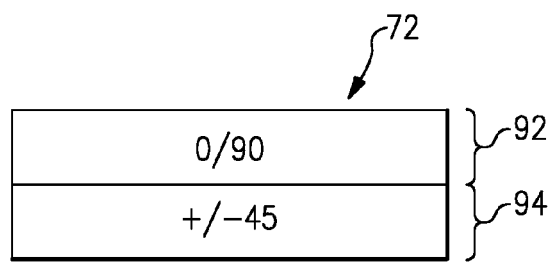
FIG. 6 illustrates an example fiber-reinforced polymer matrix composite material of a variable area fan nozzle.

In a further example, the fiber-reinforced polymer matrix material of the walls 72 and 74 of the VAFN 62 are made of a multi-layered structure, wherein each layer includes unidirectionally oriented fibers. In one example, the multi-layered structure includes 0°/90° cross-oriented layers and +/−45° cross-oriented layers. As shown in FIG. 6, the radially outer wall 72 in a further example includes a region 92 of 0°/90° cross-oriented layers and a region 94 of +/−45° cross-oriented layers. It is to be understood that the disclosed example is also representative of the radially inner wall 74.

Figures 7A, 7B, 8A, 8B:
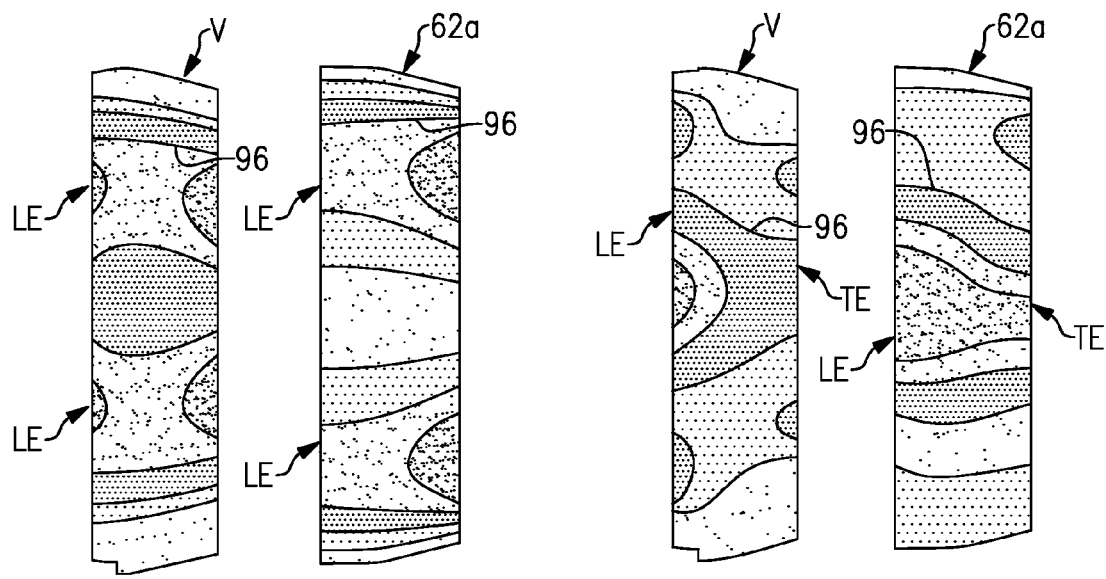
FIGS. 7A and 7B illustrate finite element analysis of fan nozzles under a bending strain mode.
FIGS. 8A and 8B illustrate another finite element analysis of fan nozzles under a torsion strain mode.

FIG. 7A illustrates an example finite element vibration mode analysis of a given VAFN section (V) that does not include the above-described wall thickness distribution 80, represented as a two-dimensional projection. At a given vibration mode frequency, the contours 96 represent regions of differing strain energy. In this example, the strain energy is a bending strain. In general, there is a relatively high amount of bending strain at a leading edge LE of the VAFN section (V).

FIG. 7B illustrates the first VAFN section 62a with the wall thickness distribution 80, represented as a two-dimensional projection. As shown, there is less bending strain energy at the leading edge LE and thus less flutter than in the given design (V).

Similarly, FIGS. 8A and 8B show the given VAFN design (V) and the first VAFN section 62a at a given vibration mode frequency under torsional strain. In the given VAFN design (V) shown in FIG. 8A, there is a significant gradient of torsional strain energy from the leading edge LE to the trailing edge TE. However, as shown in FIG. 8B, the first VAFN section 62a that has the wall thickness distribution 80 reduces the gradient from the leading edge to the trailing edge. Thus, in the examples shown in FIGS. 7A and 7B, the disclosed wall thickness distribution 80 alters the location of the flutter characteristic, and in the examples shown in FIGS. 8A and 8B, the disclosed wall thickness distribution 80 alters the amount and location of the flutter characteristic.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of controlling flutter of a fan nozzle, the method comprising:
   providing a fan nozzle having an airfoil cross-sectional shape,
      wherein the airfoil cross-sectional shape includes a pressure side wall radially spaced apart from a suction side wall,
      wherein at least one of the pressure side wall and the suction side wall has a wall thickness distribution formed by a multi-layered structure,
   determining a vibration frequency and a strain mode that would cause the fan nozzle to flutter, wherein the flutter would cause high stresses at one or more locations of the at least one of the pressure side wall and the suction side wall; and
   reducing the high stresses at the one or more locations by establishing the wall thickness distribution to include multi-layered local thick portions and multi-layered local thin portions of the least one of the pressure side wall and the suction side wall that alter the vibration frequency and the strain mode of the fan nozzle.

2. The method as recited in claim 1, wherein the strain mode is selected from a group consisting of bending strain and torsion strain.

3. The method in claim 1, further comprising providing a plurality of support walls that extend radially from the pressure side wall to the suction side wall.

4. The method as recited in claim 1, wherein the fan nozzle is arcuate.

5. The method as recited in claim 1, wherein the fan nozzle is annular.

* * * * *